US005215696A

United States Patent [19]

Weibel et al.

[11] Patent Number: 5,215,696

[45] Date of Patent: Jun. 1, 1993

[54] METHOD AND DEVICE FOR THE MANUFACTURE OF A FIBROUS MOLDED ARTICLE

[75] Inventors: Othmar Weibel, Dietlikon, Switzerland; Willi Haeseker, Berbra, Fed. Rep. of Germany

[73] Assignee: Matec Holding AG, Switzerland

[21] Appl. No.: 857,961

[22] Filed: Mar. 26, 1992

[30] Foreign Application Priority Data

Mar. 26, 1991 [CH] Switzerland .................... 00917/91

[51] Int. Cl.[5] .................................... B29C 43/02

[52] U.S. Cl. .................................... 264/119; 264/40.7; 264/517; 264/120; 425/145; 425/388; 425/394

[58] Field of Search .................... 264/37, 40.1, 40.3, 264/40.7, 517, 118, 119, 120, 121; 425/80.1, 145, 394, 395, 388

[56] References Cited

U.S. PATENT DOCUMENTS

| | | | |
|---|---|---|---|
| 2,759,837 | 8/1956 | Roberts | 264/119 |
| 4,038,531 | 7/1977 | Loe . | |
| 4,379,101 | 4/1983 | Smith | 264/40.3 |
| 4,504,182 | 3/1985 | Burkner . | |
| 4,525,321 | 6/1985 | Tonniges | 264/517 |
| 4,636,159 | 1/1987 | Heller et al. | 425/148 |
| 4,830,929 | 5/1989 | Ikeda et al. | 428/542.8 |
| 4,904,430 | 2/1990 | Yamada | 264/102 |
| 4,904,517 | 2/1990 | Lau | 428/167 |
| 4,950,444 | 8/1990 | Deboufie et al. | 264/37 |
| 5,034,181 | 7/1991 | Billiu | 264/517 |
| 5,045,262 | 9/1991 | Munk | 264/112 |
| 5,093,059 | 3/1992 | Nathoo et al. | 264/121 |

FOREIGN PATENT DOCUMENTS

| | | | |
|---|---|---|---|
| 0076429 | 4/1983 | European Pat. Off. . | |
| 2206700 | 6/1974 | France . | |
| WO91/12944 | 9/1991 | World Int. Prop. O. | 425/80.1 |

*Primary Examiner*—Mary Lynn Theisen
*Attorney, Agent, or Firm*—Wigman, Cohen, Leitner & Myers

[57] ABSTRACT

With the described method, fibrous compression molded articles are produced and the material components to be used are prepared in a suitable ratio and are deposited positively to form relief-like molded article blanks. The blanks are subjected to a heat treatment for condensation of the binding agent and are set in a parison mold into parison blanks, before they are fed to a compression mold. An especially suitable depositing device for this method for formation of the molded article blank is connected in one preferred embodiment with a carousel-like feed table and a governing device with which a plurality of compression molds can be charged and utilized optimally.

7 Claims, 1 Drawing Sheet

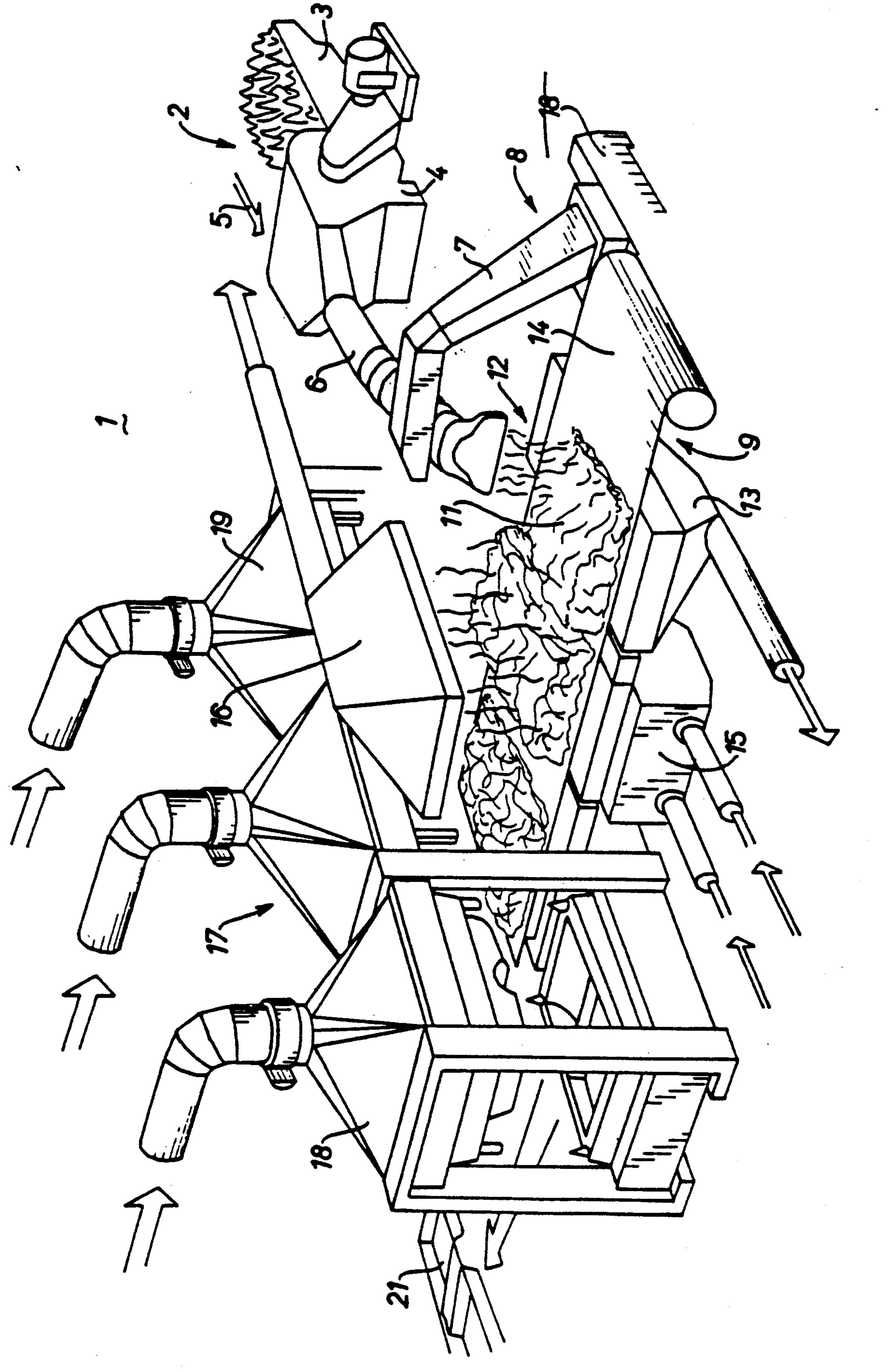
1
2
3
4
5
6
7
8
9
11
12
13
14
15
16
17
18
19
21

METHOD AND DEVICE FOR THE MANUFACTURE OF A FIBROUS MOLDED ARTICLE

BACKGROUND OF THE INVENTION

1. Field of the Invention

The present invention relates to a method for manufacturing compressed fibrous molded articles used in automobile construction, apparatus for carrying out the method and the compression molded articles formed by the method and apparatus. More particularly, fibers, binder agents and additives are fed by means of a first device into a feed passage, in which the infed material components are deposited by means of a second device in such a manner as to form a molded article blank on a conveyor device. The molded article blank is deposited on a conveyor device to a heating device, where the molded article blank is predried and the binding agent is condensed by a heat treatment, in order subsequently to be molded into a parison blank in a parison mold. The partially formed blank is placed in a compression mold and a compression molded article is produced from the partially molded blank.

2. Description of the Prior Art

The aforementioned method and devices are used essentially in the automobile industry which applies such compression molded articles to inside fittings of vehicles. The good sound and heat insulating properties of these fibrous molded articles are especially valuable for this type of use. To correctly fulfill the specific geometric, acoustic and strength requirements, these molded articles may include regions with inherently different thicknesses and identical densities or identical thicknesses and different densities.

In the known methods, the materials to be processed are deposited uniformly on a conveyor belt, in order to temporarily produce a non-woven fabric having uniform thickness and uniform density. This prefabricated non-woven fabric is subsequently fed through a contouring device, in which the desirable relief shapes are cut out, milled out, sawn out of and/or removed by suction from the non-woven fabric. Compression molded articles anticipating the aforementioned requirements can be produced with this contouring treatment of the nonwoven fabric.

However, these known methods have various drawbacks. For example, great quantities of waste scraps are produced by the known contouring treatment, which are generally not recycled, since the manufacture of the nonwoven fabrics and the manufacture of the compression molded articles are undertaken in operations independent of one another.

Also, modification of the contouring tools is required each time a new contour is to be shaped, whether the tools are cutting rollers, contouring blades or milling head arrangements. These tool modifications are expensive and therefore the compression molded articles must always be manufactured in large quantities and more problematical storage requirements must be taken into consideration.

OBJECTS AND SUMMARY OF THE INVENTION

A primary object of this invention is to provide a method which overcomes the drawbacks of the prior art methods.

Another object is to provide a low-cost and flexible method which produces no waste scraps, which requires no new contouring tools for production of the different configurations of molded articles and allows for optimum charging of the entire installation.

Other objects and advantages of the present invention will become apparent from the description and drawings which follow.

The objectives according to the invention are attained in the manufacture of the nonwoven fibrous fabric blanks and the manufacture of the compression molded articles.

Especially important to the invention is a controllable depositing device which does not produce a uniformly apportioned nonwoven fabric, but rather deposits a shaped blank, shaped corresponding to the molded article to be fabricated. This relief-like deposited blank is preset and pre-arranged in the assembly line without intermediate storage which can be molded into its final shape on site.

Since the length of time required for depositing a molded article blank is considerably shorter than the dwell time of the blank in the heating device, the parison mold or the compression mold, several molds can be charged at the same time according to this invention. Thus, the manufacture of the compression molded articles can be carried out more rapidly and at lower cost.

In a further aspect of the invention, the controllable depositing device is connected with a governing device which coordinates all of the devices required for the manufacturing steps in order to optimally utilize the compression molds. For instance, the velocity of the feed of material components and their composition can be varied with this arrangement. Also, the conveyance velocity and the dwell time in the heating device or the presses can be varied.

Thus, the costly intermediate storage of prefabricated or already manufactured partially molded blanks is avoided.

In yet another aspect of the manufacturing process according to the invention, molds for different molded articles are used simultaneously and the controllable depositing device is controlled in such a manner that for any one certain mold a compression molded article blank is deposited corresponding to the shape of that particular mold.

The use of one or more carousel-like feed tables has proven especially suitable for charging the molds. In this arrangement, the molded article blanks are deposited on this carousel-like feed table and cyclically are either guided directly through a heating device for the heat treatment or are rotated separately and individually to a manufacturing column which is already standing free for further treatment or will become free.

The advantages of the method according to the invention are directly applicable to the manufacture of fibrous compression molded articles suitable for use in the automobile industry since no special tools are required for contouring the molded article blanks and also no material scraps are accumulated from this manufacturing stage.

The present invention allows for rapid and individual manufacture of molded article blanks and leads to a flexible manufacturing installation which can be charged optimally. In other words, it provides a manufacturing installation of overall low-cost operation. When defective molded articles, blanks, fragments or clippings are detected in the course of quality control inspections such scraps are easily retained to the input device and used again without any added cost.

BRIEF DESCRIPTION OF THE DRAWING

Hereinafter, the invention is to be explained in greater detail relative to one exemplary embodiment and with the aid of the attached drawing, wherein:

FIG. 1 is a pictorial representation of an apparatus used in carrying out the present invention.

DETAILED DESCRIPTION OF THE PREFERRED EMBODIMENTS

The apparatus as shown in the drawing is employed for execution of the method according to the invention. The apparatus includes a first device 2 which includes a container 3 intended to receive suitable raw materials, especially fibrous materials made up predominantly of organic fibers, such as cotton, sisal, banana fibers, etc. This raw material is finely broken down in a willowing machine 4 to predetermined requirements. Device 2 also has an inlet 5 through which the fibers, the binding agent in powder form and additive materials are thoroughly mixed. These agents are essentially resin compounds which are conventionally used by those skilled in this art. In addition to the conventional resins, chitin-containing materials could also be used as additive materials. These materials impart stability and extraordinarily lightweight characteristics to the final products. Device 2 conveys the mixed components in the desired composition into a feed passage 6, which can be moved like a trunk at its discharge end. It is to be understood that willowing machine 4 is provided with an adjustable roller in order to be able to adjust the quantity and composition of the raw material being conveyed. Device 2 is likewise provided with regulating mechanisms, for instance flaps, in order to regulate the desired air-fiber-resin mixture and its feed velocity in feed passage 6.

The trunk-like end of feed passage 6 is held and guided by a controllable arm 7 of the controllable deposit device 8. This arm moves the trunk-like end of the feed passage 6 in a predetermined manner over a pre-existing surface of the conveyor in order to form a fiber-mountain-shaped fibrous material deposit 11 corresponding to any desired geometric distribution, in short a molded article blank. It is to be understood that the discharge opening of feed passage 6 is to be of suitable shape.

It is helpful if the material to be processed can also be deposited in a suitably dimensioned collection receptacle. In a further developed embodiment, these receptacles have suitably deep-drawn, saucer-like bottom contours.

The deposit surface on which the molded article blanks 11 are constructed is air-permeable and, as part of the second device 12, lies over a suction device 13, with which the fibrous material is held securely in its deposited contour.

The conveyor 9 includes a conveyor belt 14 which carries the deposited fibrous material forming blank 11 to a heating device 15. The binding agents, especially phenolic resins, are condensed or set in heating device 15. The parameters of this heat treatment, including temperature and time of application, depend for the most part upon the composition of the binding agent being used and are known to those skilled in the art as described in European Patent A-76429, the subject matter of which is incorporated by reference. According to the invention this treatment is controlled through a governing device 81 coupled with the controllable deposit device 8. Traditionally the vapors exuding from this treatment are collected and carried away in an outlet 16.

The molded article blanks 11 treated in such a manner are then fed to a parison mold 17 and therein are compressed, preshaped and set in a known manner by means of hot vapor to form a parison blank.

The apparatus shown in the drawing includes two compression molds 18, 19, which shape the desired molded shapes 21 out of the parison blanks. These molds preferably have cutting tools at their peripheries, in order to cut off possible excess borders of the molded articles.

In one preferred but not shown exemplary embodiment, the conveyor device includes a rotatable feed table on which can be deposited a plurality of blanks 11. This carousel-like feed table serves essentially for the coordinated charging of the compression molds and according to the invention is coupled by means of governing device 81 with controllable depositing device 8. It is to be understood that for optimum charging of the individual molds, their controls are likewise suitably connected with governing device 81. With the present invention and a correspondingly constructed governing device 81, a plurality of compression molds for various differently configured compression molded articles can be charged without any problem, so that costly out-of-service times arise neither for the deposit device nor for the individual molds.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Method for the manufacture of fibrous compression molded articles suitable for use in automobile construction comprising the steps of:
   - mixing fibers and binding agents;
   - depositing said mixed fibers onto a conveyor in such a manner as to form relief-like molded article blanks at desired points and in desired quantities;
   - heating said article blanks to predry and condense the binding agent; and
   - molding said dried blanks into a parison blank.

2. Method as in claim 1, further including the step of compression molding said parison blank into a finished article.

3. Method as in claim 2, wherein said molded article blanks are deposited by a controllable deposit device for the formation of compression molded articles of various configurations.

4. Method as in claim 3, wherein said controllable deposit device has a governing device by means of which quantity and velocity of material components being fed in, velocities of the conveyor device, the heating step and the compression molding step are carried out in a sequential and optimal manner.

5. Method as in claim 1, further including the steps of collecting defective parison blanks, fragmented pieces and cutting scraps and recycling said materials.

6. Apparatus for the manufacture of fibrous compression molded articles suitable for use in automobile construction, comprising a first device to feed fibers, binding agents and additive materials into a feed passage; a second device for depositing the fed-in materials and for forming molded article blanks on a conveyor device; said second device includes a controllable deposit device for depositing the fed-in material components at the desired points and in the desired quantity and for forming relief-like molded article blanks; a heating device for condensation of the binding agent and for pre-drying; a parison mold for molding the blanks into parison blanks; and a compression mold for the production of compression molded articles.

7. Apparatus of claim 6, wherein the controllable deposit device for the deposit of molded article blanks is suitable for various differently configured compression molded articles and is connected with a governing device.

* * * * *